United States Patent [19]
Burkhardt et al.

[11] Patent Number: 4,703,208
[45] Date of Patent: Oct. 27, 1987

[54] WRISTWATCH STEPPING MOTOR

[75] Inventors: Wolfgang Burkhardt, Ispringen; Wolfgang Kröner, Pforzheim, both of Fed. Rep. of Germany

[73] Assignee: Pforzheimer Uhren-Rohwerke PORTA G.m.b.H, Pforzheim, Fed. Rep. of Germany

[21] Appl. No.: 861,847

[22] Filed: May 12, 1986

[30] Foreign Application Priority Data

Jun. 25, 1985 [DE] Fed. Rep. of Germany ....... 3522689

[51] Int. Cl.$^4$ ............................................. H02K 37/00
[52] U.S. Cl. .................................... 310/49 R; 310/162
[58] Field of Search ........................... 310/49, 162-165

[56] References Cited
U.S. PATENT DOCUMENTS

| | | | |
|---|---|---|---|
| 4,141,210 | 2/1979 | Flaig | 310/49 X |
| 4,186,322 | 1/1980 | Besson | 310/49 X |
| 4,324,992 | 4/1982 | Paratte | 310/49 |
| 4,473,766 | 9/1984 | Obergfell et al. | 310/49 X |

*Primary Examiner*—Donovan F. Duggan

[57] ABSTRACT

A wristwatch stepping motor comprises mounted on a support plate a rotor, an armature consisting of two portions each with a pole structure disposed at opposite sides of the rotor and a coil mounted on a coil core which is integral with one of the armature portions, the other armature portion being spaced from the coil core and being so mounted that its one end is in abutment with the free end of the coil core and the pole structures of both armature portions together with the rotor are arranged outside the area around the coil core, both armature portions being located by collars and sleeves projecting from the support plate to facilitate automatic assembly of the motor.

5 Claims, 2 Drawing Figures

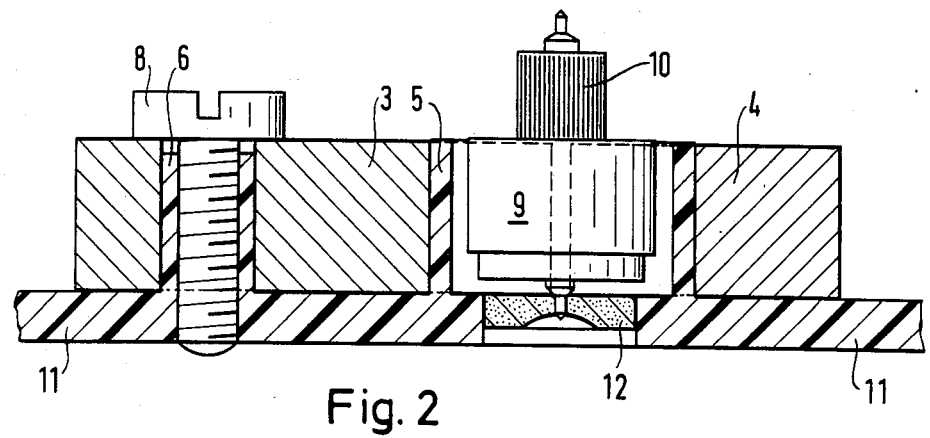
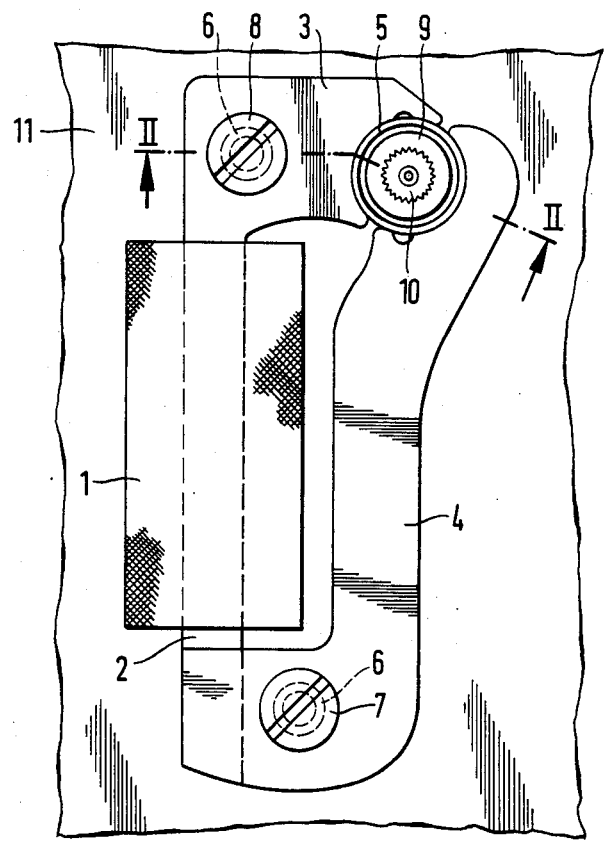

WRISTWATCH STEPPING MOTOR

BACKGROUND OF THE INVENTION

The invention relates to a stepping motor of a wristwatch which motor is mounted on a support plate and which, with regard to its magnetic circuit, consists of a magnetic coil, a magnetic core disposed in the coil, an armature for conducting the magnetic flux from the magnetic core and a rotor enclosed by the armature, the armature being divided by a gap extending along a plane receiving the rotor's axis.

Such stepping motor arrangements are generally rectangular in shape wherein the coil is arranged along one of the rectangle's longer sides while the rotor is arranged in the other longer side of the rectangle. In this arrangement the side provided with the coil is the magnetic core from which extend L-shaped armature portions which have short legs disposed adjacent the ends of the coil core or in engagement with the ends of the coil core and which have pole pieces for the rotor formed at the ends of the other legs.

Manufacture of the coil with the coil core is possible in two ways: Firstly, the coil may be directly wound onto the coil core or, secondly, a hollow coil may be made into which the core is then inserted. Although manufacture of such hollow coils is possible in an automated process with hardly any difficulties, it is advantageous to wind the coil directly onto the core, especially for use in wristwatches since this provides for better space utilization. Such direct winding of the coil onto the core however is only possible if the radial area around the coil is free of obstructive components as is the case for example in the arrangement described in DE AS No. 2434452 which has coil core end portions that are bent over like horns such that the area between the bentover portions is free of obstructive components. After the winding of the coil the armature portions are placed onto those bent-over portions and screwed thereto. Such an arrangement however has the disadvantage of having two connecting areas so that there are two points of magnetic resistance between the coil core and the armature members. The arrangement also requires difficult and timeconsuming positioning of the parts.

Generally it is noted that proper positioning of the pole pieces at the ends of the armature members relative to the rotor is of utmost importance for proper operation of the motor. If the pole pieces are not properly positioned relative to the rotor, there are not only changes in the magnetic line circuit which might cause immediate malfunction of the stepping motor but which may result in later mechanical problems especially with the presence of some impurities. In order to prevent such problems, armatures have been proposed which do not consist of two parts but which are unitary and provided with an opening for the reception of the rotor. In order to provide for the necessary interruption of the magnetic circuit path at the rotor location, the armature structure is very thin, that is, it provides only for narrow interconnecting sections around the rotor so as to generate a relatively high magnetic resistance in this area. Nevertheless a relatively large amount of magnetic field lines may still pass through the interconnecting sections, though narrow, and these magnetic lines are lost for the generation of rotor drive forces. As a result the energy consumption of the motor is relatively high, that is, the life span of the battery included in the wristwatch is relatively short. It is noted however that assembly of the watch is facilitated and is easily possible with automatic manufacturing equipment since, after sliding the coil onto the core, only connecting members need to be placed between the armature and the coil core. This arrangement however still has a number of connecting points which require accurate positioning.

It is the object of the present invention to provide a watch stepping motor with a divided armature which will permit the winding of the coil or the sliding of a pre-wound coil onto the core and which does not require difficult position adjustments so that the stepping motor may be assembled by robots.

SUMMARY OF THE INVENTION

In a wristwatch stepping motor which has a rotor, a two-section armature and an armature coil with a coil core mounted on a support plate, the coil and the coil core, which is integral with one armature portion project away from the rotor and the other armature portion is disposed with one end in abutment with the projecting end of the coil core and extends spaced therefrom but essentially parallel to the coil core. The rotor is disposed in a cavity formed between pole structures at the other ends of the armature portions which are both disposed away from the area around the coil so that machine winding of the coil onto the core is facilitated. Both armature portions are accurately positioned by a collar surrounding the rotor and sleeves extending through openings in the armature portions which collar and sleeves extend from, and are preferably integrally formed with, the support plate to facilitate automatic assembly of the motor.

With this arrangement the rotor is not disposed adjacent the center section of the coil but is remote from the radial area around the coil core. This arrangement permits the direct winding of the coil onto the core without any difficulties and also results in a reduction of thickness of the stepping motor with regard to the cross-section of the coil and it also facilitates the slipping of a pre-wound coil onto the core. The only disadvantage of the arrangement would be that armature and core members are difficult to position properly relative to the rotor since both armature and core portions should be mounted at two spaced locations. In order to eliminate this problem there is provided in accordance with the present invention an annular ledge or collar projecting from the support plate which ledge surrounds the rotor and in abutment with which the armature pole structures are disposed for proper positioning thereof relative to the rotor, the armature portions being mounted to the support plates by bolts arranged remote from the annular ledge.

The accurate positioning of the pole portions of the armature, which is critical for the operation of such a stepping motor, is assured in the given arrangement by the annular abutment ledge projecting from the support plate. Also the armature section including the coil core is positioned by the guidance of the abutment ledge in a well-defined manner such that no additional positioning structure is needed at the free end of the coil core although an additional adjustment structure at the free end of the other armature portion is advantageous.

Altogether there are therefore only two positioning points which furthermore are easily workable in connection with the abutment ledge. This arrangement eliminates difficult and time-consuming adjustment operations and facilitates robot assembly of the stepping motor on the support plate. The annular ledge may be formed from the support plate which is normally a brass plate by punching, whereby not only the annular ledge may be formed but the whole area adjacent the armature portions may be raised. It is also possible to insert into an appropriate opening in the support plate a collar of a non-magnetic material which is then abutted by the two armature portions. If the support plate consists of a plastic material the collar may be integrally formed with the support plate by injection molding and it may have the same height over the support plate as the armature portions. Finally, the positioning structure consists preferably of threaded sleeves which serve at the same time as anchor points for mounting armature portions or rather for the stepping motor.

SHORT DESCRIPTION OF THE DRAWINGS

FIG. 1 is a plan view of a stepping motor; and
FIG. 2 is a sectional view taken along line II—II of FIG. 1.

DESCRIPTION OF A PREFERRED EMBODIMENT

As shown in FIG. 1 a stepping motor according to the invention includes a coil 1 which is directly wound onto a coil core 2. This is possible because the armature portion 3, which is integral with the core 2, forms together with the coil core 2 an L-shaped punched member wherein the long leg is the coil core 2 and the short leg forms the armature portion 3. The opposite armature portion 4 is also essentially L-shaped and with its short leg is disposed in abutment with the coil core 2. The portion 4 is so bent that it extends essentially parallel to the coil core 2 but is spaced therefrom a distance adapted to the thickness of the coil. The ends of the armature portions 3, 4 are disposed adjacent one another and together have a circular cavity formed therebetween and are in engagement with a collar 5. Spaced from the collar 5 the armature portions are held by positioning sleeves 6 which are threaded to threadedly receive the mounting screws 7, 8. A rotor 9 is rotatably supported within the collar 5. At its free end the rotor 9 carries a gear 10. At its other end the rotor is supported by a jewel bearing 12 supported in an opening in the support plate 11. The support plate is preferably molded of plastic material, the collar 5 and the mounting sleeves 6 for the mounting screws 7, 8 being preferably integrally molded with the support plate 11.

From FIG. 1 it is apparent that the armature is composed of two sections such that optimum conditions for utilization of the magnetic flux are provided, both armature portions 3, 4 and also the coil core 2 being accurately positioned by engagement with the collar 5 and also with the positioning sleeves 6 so that automatic assembly of the stepping motor is easily possible. It is further pointed out that the coil 1 may be wound directly onto the coil core 2 since the armature portion 3 is outside the area around the core 2 so that one assembly step (the moving of the pre-wound coil onto the core) is omitted, but also good electromagnetic conditions are provided and more favorable space utilization is achieved.

We claim:

1. A wristwatch stepping motor comprising a support plate, a rotor and an armature with a magnetic coil supported on said support plate, a collar projecting from said support plate and extending around said rotor, said armature consisting of two essentially L-shaped armature portions each having a long and a short leg and being mounted on said support plate so as to form together an essentially rectangular armature with four corner areas, the long leg of one of the L-shaped armature portions being straight and of uniform cross-section and forming a coil core adapted to facilitate reception of said magnetic coil and being disposed at its free end in intimate abutment with the short leg of the other of said L-shaped armature portions so as to form a first corner area adapted to facilitate passage of magnetic flux, the short leg of the one and the long leg of the other L-shaped armature portions being separated in the corner area diagonally opposite said first corner area and shaped so as to form pole structures engaging therebetween said collar for firmly positioning said armature portions at the pole structure ends thereof, each armature portion having a bolt extending therethrough spaced from said collar for mounting said armature portions on said support plate.

2. A stepping motor according to claim 1, wherein said coil is directly wound onto the coil core section of said one armature portion.

3. A stepping motor according to claim 1, wherein said collar is formed integrally with said support plate.

4. A stepping motor according to claim 1, wherein positioning sleeves extend from said mounting plate and through appropriate openings in said armature portions for properly positioning said armature portions, said sleeves having internal threads and said mounting bolts being threaded into said sleeves.

5. A stepping motor according to claim 4, wherein said positioning sleeves are formed integrally with said support plate.

* * * * *